United States Patent
Maruyama et al.

(10) Patent No.: US 10,295,883 B2
(45) Date of Patent: May 21, 2019

(54) OPTICAL MODULE AND OPTICAL MODULATOR

(71) Applicant: Fujitsu Optical Components Limited, Kawasaki-shi, Kanagawa (JP)

(72) Inventors: Shinji Maruyama, Sapporo (JP); Masaharu Doi, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/649,185

(22) Filed: Jul. 13, 2017

(65) Prior Publication Data

US 2018/0095339 A1 Apr. 5, 2018

(30) Foreign Application Priority Data

Sep. 30, 2016 (JP) ................. 2016-194717

(51) Int. Cl.
*G02F 1/035* (2006.01)
*G02F 1/225* (2006.01)
*G02F 1/21* (2006.01)

(52) U.S. Cl.
CPC ............ *G02F 1/2257* (2013.01); *G02F 1/225* (2013.01); *G02F 1/2255* (2013.01); *G02F 2001/212* (2013.01); *G02F 2201/02* (2013.01); *G02F 2201/12* (2013.01)

(58) Field of Classification Search
CPC ............. G02F 1/2257; G02F 2001/212; G02F 2201/12; G02F 2201/02
See application file for complete search history.

(56) References Cited

U.S. PATENT DOCUMENTS

| | | | | |
|---|---|---|---|---|
| 8,428,399 | B2* | 4/2013 | Takabayashi | B82Y 20/00 385/2 |
| 8,467,634 | B2* | 6/2013 | Sugiyama | G02F 1/225 385/2 |
| 8,620,115 | B2* | 12/2013 | Webster | G02F 1/2257 385/1 |
| 2009/0269006 | A1* | 10/2009 | Ishikawa | G02B 6/421 385/25 |
| 2010/0232737 | A1 | 9/2010 | Sugiyama et al. | |
| 2014/0133794 | A1* | 5/2014 | Kono | G02F 1/225 385/3 |
| 2016/0164251 | A1* | 6/2016 | Yashiki | G02B 6/4204 385/2 |

FOREIGN PATENT DOCUMENTS

JP 2010-217427 9/2010
JP 2016-71199 5/2016

* cited by examiner

*Primary Examiner* — Ellen E Kim
(74) *Attorney, Agent, or Firm* — Staas & Halsey LLP

(57) ABSTRACT

An optical module includes a driver that is provided on a board and generates an electrical signal according to a data signal, and an optical modulator that is connected to an optical fiber and provided on the board and that modulates light emitted from the optical fiber using the electrical signal generated by the driver. The optical module has a cut-out portion that is formed by cutting out part of its outer shape and that accommodates the driver so that the driver overlaps the optical fiber when viewed from a direction perpendicular to the board.

5 Claims, 7 Drawing Sheets

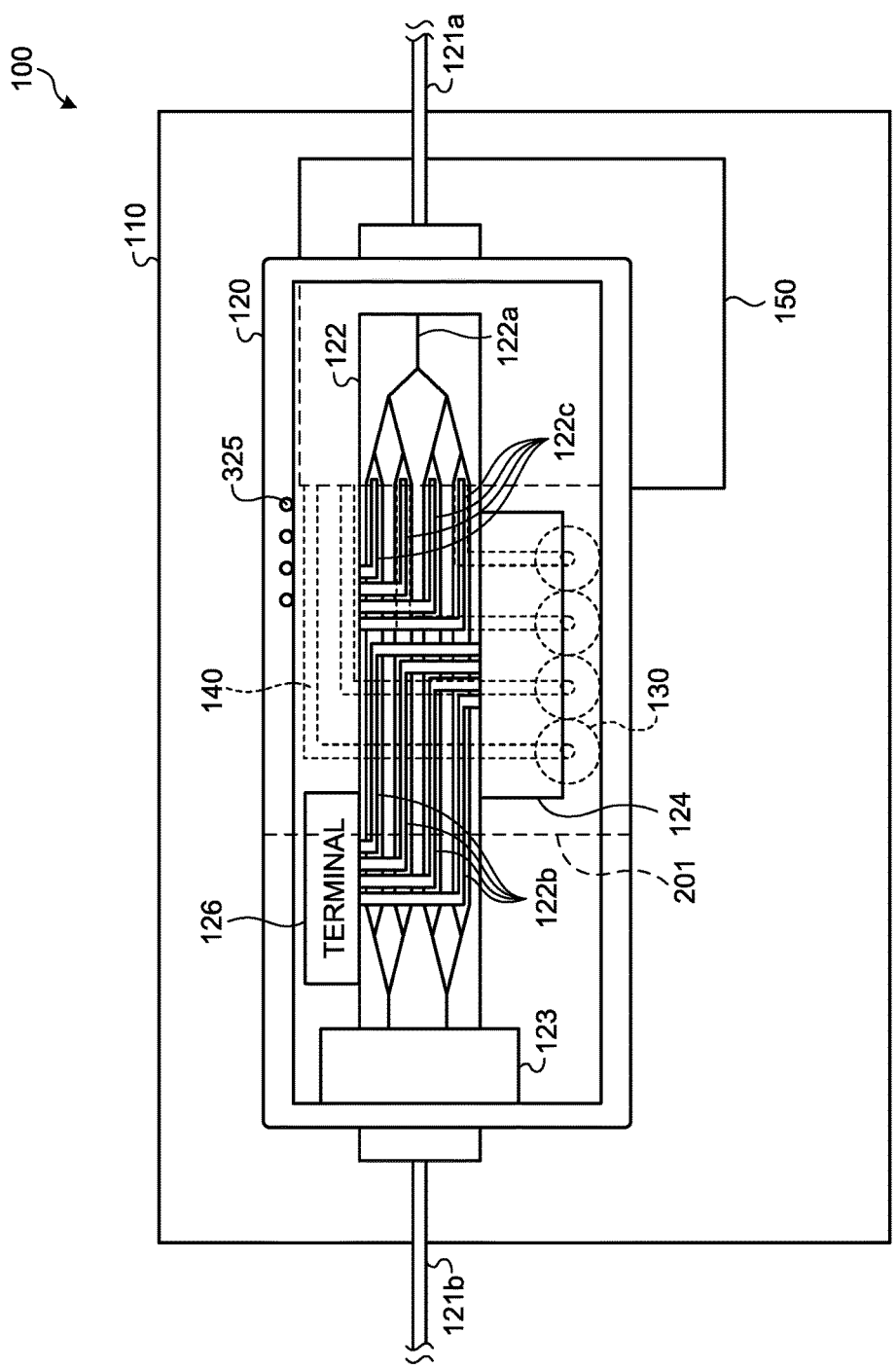

OPTICAL MODULE AND OPTICAL MODULATOR

CROSS-REFERENCE TO RELATED APPLICATION

This application is based upon and claims the benefit of priority of the prior Japanese Patent Application No. 2016-194717, filed on Sep. 30, 2016, the entire contents of which are incorporated herein by reference.

FIELD

The embodiment discussed herein is related to an optical module and an optical modulator.

BACKGROUND

Conventionally, a Mach-Zehnder interferometer is sometimes used as an optical modulator connected to an optical fiber and for modulating light emitted from the optical fiber. In recent years, because an optical modulation method is diversified, the optical modulator often includes a plurality of Mach-Zehnder interferometers. In this case, by integrating the Mach-Zehnder interferometers on one chip, it is possible to reduce the size of the optical modulator.

In the optical modulator provided with the Mach-Zehnder interferometers, signal electrodes and ground electrodes are formed along parallel Mach-Zehnder type optical waveguides. For example, a radio frequency (RF) electrode for a high-frequency signal for superimposing data on light and a direct current (DC) electrode for a DC signal for controlling the phase of light are, in some cases, provided as signal electrodes in the optical modulator. Of these electrodes, the RF electrode is connected to an RF pin as a lead pin, and an RF signal being an electrical signal according to a data signal is input from the RF pin. The light emitted from the optical fiber is then modulated by the RF signal input to the RF electrode.

Patent Literature 1: Japanese Laid-open Patent Publication No. 2010-217427

Patent Literature 2: Japanese Laid-open Patent Publication No. 2016-71199

An RF pin of an optical modulator and a driver that generates an RF signal according to a data signal may sometimes be connected to each other via, for example, flexible printed circuits (FPC). In other words, one end of the FPC on the driver side is electrically connected to a wiring pattern for outputting the RF signal sent from the driver, and one end of the FPC on the optical modulator side is accommodated in a cut-out portion formed in the optical modulator and is electrically connected to the RF pin protruding toward, for example, the cut-out portion. However, when the RF pin of the optical modulator and the driver are connected to each other via the FPC, the size of the optical modulator is increased along the direction in which the FPC extends, and the mounting area may be increased. Therefore, the connection using the FPC is not practical.

Therefore, it is conceivable that the driver is accommodated in the cut-out portion of the optical modulator and the driver and the optical modulator are connected in the cut-out portion by a connecting member other than the FPC, thereby reducing the mounting area corresponding to the driver and reducing the size of the device. For example, it is conceivable that a connector electrically connected to the RF electrode is embedded in the upper surface of the cut-out portion of the optical modulator, the driver is accommodated in the cut-out portion of the optical modulator so as to face the connector, and that the wiring pattern for outputting the RF signal from the driver and the connector are connected by coaxial pins. However, in this configuration, because the wiring for inputting the data signal to the driver reaches an input interface of the data signal by detouring the position opposite to the connector across the driver, detouring of the wiring makes it difficult to arrange other components in an arrangement space of the wiring. As a result, because this configuration requires another arrangement space for arranging other components, there is a problem that the mounting area is not effectively used.

In this way, in the configuration in which the driver is accommodated in the cut-out portion of the optical modulator, it is expected to achieve downsizing of the device by reducing the mounting area.

SUMMARY

According to an aspect of an embodiment, an optical module includes a driver that is provided on a board and generates an electrical signal according to a data signal; and an optical modulator that is connected to an optical fiber and provided on the board and that modulates light emitted from the optical fiber using the electrical signal generated by the driver, wherein the optical module has a cut-out portion that is formed by cutting out part of an outer shape of the optical module and that accommodates the driver so that the driver overlaps the optical fiber when viewed from a direction perpendicular to the board.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a schematic plan view illustrating a configuration of an optical module according to a fifth modification.

DESCRIPTION OF EMBODIMENT

Preferred embodiment of the present invention will be explained with reference to accompanying drawings. In addition, the disclosed technology is not limited by the embodiments.

Figure 1:
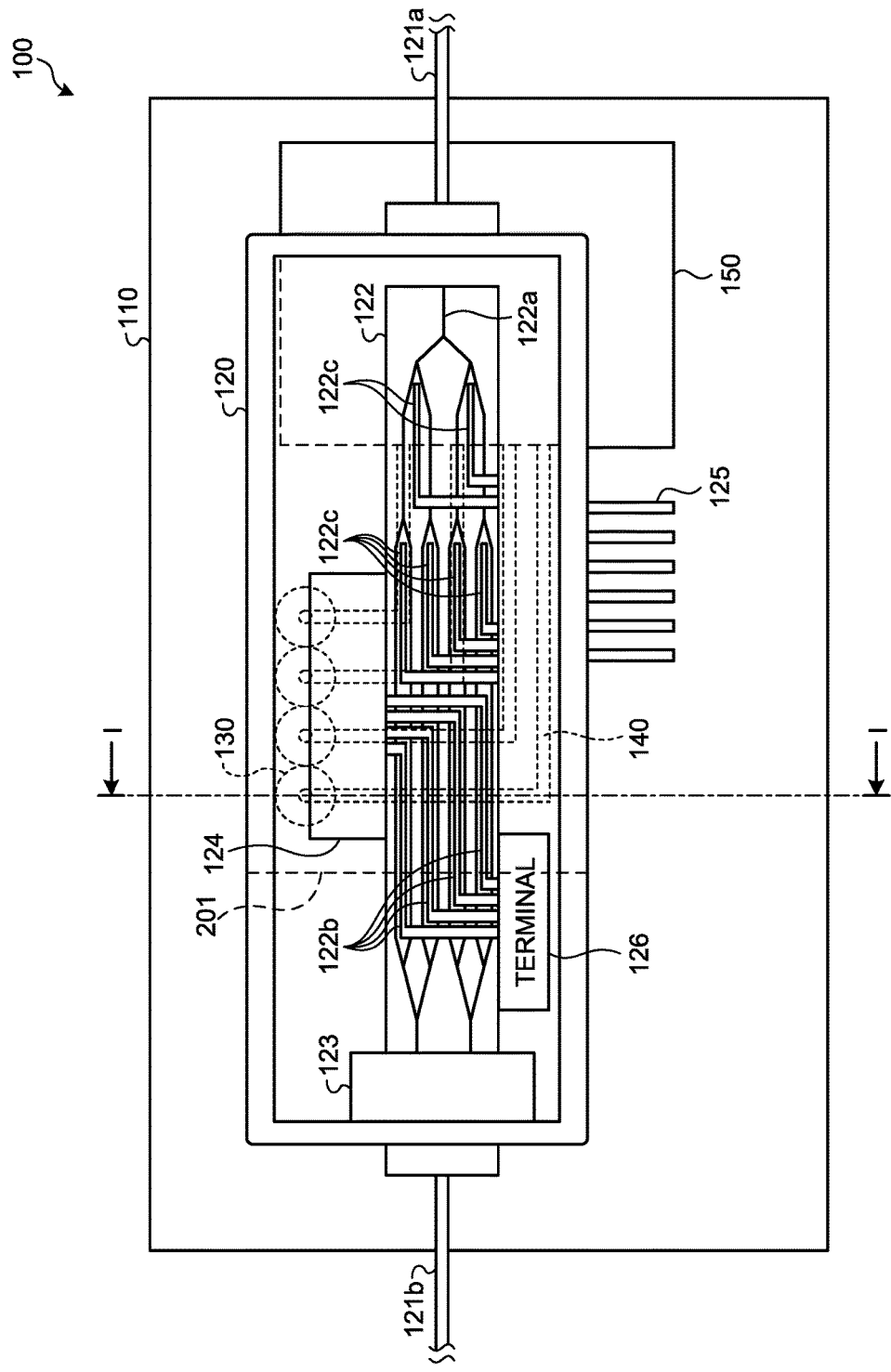
FIG. 1 is a schematic plan view illustrating a configuration of an optical module according to a present embodiment.

FIG. 1 is a schematic plan view illustrating a configuration of an optical module 100 according to a present embodiment. The optical module 100 illustrated in FIG. 1 includes a printed circuit board (PCB) 110, an optical modulator 120, a connecting member 130, a wiring pattern 140, and a driver 150.

The PCB 110 is, for example, a glass epoxy board, and mounts thereon various components constituting the optical module 100. An input interface of a data signal is mounted on the PCB 110 although it is not illustrated in FIG. 1. The input interface is formed at a position close to an optical fiber 121*a* connected to the optical modulator 120. A wiring pattern is printed on the surface of the PCB 110, and, for example, the input interface and the driver 150 are electrically connected to each other by the wiring pattern.

The optical modulator 120 is connected to the optical fiber 121*a* to which light is input and to an optical fiber 121*b* from which the light is output. The optical modulator 120 modulates the light emitted from the optical fiber 121*a* and outputs an optical signal. At this time, the optical modulator 120 performs optical modulation based on the RF signal which is a high-frequency electrical signal output from the driver 150. Moreover, the optical modulator 120 performs phase control of the optical signal based on a DC signal which is a direct-current electrical signal output from a large scale integration (LSI) (not illustrated). Specifically, the optical modulator 120 includes a modulator chip 122, a polarization beam combiner (PBC) 123, a relay board 124, a DC terminal 125, and a termination board 126.

The modulator chip 122 includes an optical waveguide 122*a*, signal electrodes, and ground electrodes, and generates an optical signal by performing optical modulation thereon while propagating the light emitted from the optical fiber 121*a* through the optical waveguide 122*a*. The modulator chip 122 includes, as signal electrodes, an RF electrode 122*b* to which the RF signal is input and a DC electrode 122*c* to which a DC signal is input. The modulator chip 122 performs optical modulation based on the RF signal input to the RF electrode 122*b*. Moreover, the modulator chip 122 performs phase control of the optical signal based on the DC signal input to the DC electrode 122*c*. The positional relationship between the RF electrode 122*b* and the DC electrode 122*c* will be explained later.

The optical waveguide 122*a* is formed on part of a crystal substrate using electro-optic crystal such as lithium niobate (LiNbO3 (LN)) and lithium tantalate (LiTaO3) by forming a metal film such as titanium (Ti) and thermally diffusing the metal film into the crystal substrate. Moreover, the optical waveguide 122*a* may be formed by proton exchange in benzoic acid after patterning. On the other hand, the signal electrodes and the ground electrodes are coplanar electrodes formed along parallel optical waveguides 122*a*. As illustrated in FIG. 1, as the parallel optical waveguides 122*a*, a plurality of parallel Mach-Zehnder type optical waveguides are formed on the modulator chip 122. In other words, a pair of first Mach-Zehnder type optical waveguides branched from one input optical waveguide and a pair of second Mach-Zehnder type optical waveguides formed in each of branching waveguides (arm) of the respective first Mach-Zehnder type optical waveguides are formed on the modulator chip 122. The signal electrodes (i.e., RF electrode 122*b* and DC electrode 122*c*) are patterned on, for example, the respective Mach-Zehnder type optical waveguides. In the example of FIG. 1, two first Mach-Zehnder type optical waveguides and four second Mach-Zehnder type optical waveguides are formed. Therefore, four RF electrodes 122*b* are formed corresponding to the four second Mach-Zehnder type optical waveguides, and six DC electrodes 122*c* are formed corresponding to the two first Mach-Zehnder type optical waveguides and the four second Mach-Zehnder type optical waveguides.

The PBC 123 combines two optical signals output from the modulator chip 122, and outputs an optical signal including two polarized waves whose polarization directions are perpendicular to each other. In other words, the PBC 123 rotates the polarization direction of one of the optical signals output from the modulator chip 122 and then combines the optical signal to the other optical signal.

The relay board 124 relays the RF signal output from the driver 150 to the modulator chip 122, and inputs the RF signal to the RF electrode 122*b* of the modulator chip 122. As illustrated in FIG. 1, the relay board 124 includes four wiring patterns corresponding to the four RF electrodes 122*b* formed on the modulator chip 122.

The DC terminal 125 is, for example, a terminal to which the DC signal output from the LSI is input. A plurality of DC terminals 125 are arranged, for example, in line on the side face of the optical modulator 120 according to the number of DC electrodes 122*c* of the modulator chip 122. As illustrated in FIG. 1, six DC terminals 125 are provided corresponding to six DC electrodes 122*c* formed on the modulator chip 122. The DC terminals 125 are connected to the DC electrodes 122*c* of the modulator chip 122 by connecting members such as wires. The phase control of the obtained optical signal is performed in the optical modulator 120 by the DC signal input to the DC terminal 125.

The termination board 126 has a function that suppresses reflection of the RF signal by mounting a resistive component (not illustrated), connecting the resistive component to the terminal of the RF electrode 122*b* on the modulator chip 122, and electrically terminating the RF signal input to the RF electrode 122*b*.

The connecting member 130 connects the driver 150 and the optical modulator 120 in a cut-out portion 201 formed near the PCB 110 of the optical modulator 120, and supplies the RF signal output from the driver 150 to the optical modulator 120. In other words, one end of the connecting member 130 is electrically connected to the relay board 124 of the optical modulator 120, and the other end of the connecting member 130 is electrically connected to the driver 150. For example, a coaxial pin is used as the connecting member 130.

The wiring pattern 140 is a wiring connected to the driver 150 and printed on the PCB 110, and propagates the RF signal output from the driver 150 to the connecting member 130. The wiring pattern 140 and the connecting member 130 are connected by, for example, a connector.

The driver 150 generates an electrical signal for modulating the light emitted from the optical fiber 121*a*. That is, the driver 150 generates an RF signal which is a high-frequency electrical signal with amplitude/phase according to the data signal input from an input interface (not illustrated) and drives the optical modulator 120 by the generated RF signal.

Figure 2:
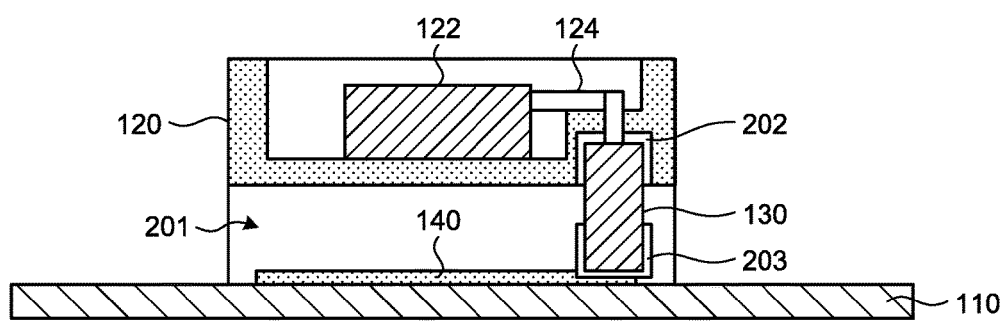
FIG. 2 is a diagram for explaining an electrical connection between an optical modulator, a connecting member, and a driver according to the present embodiment.

An electrical connection between the optical modulator 120, the connecting member 130, and the driver 150 will be explained next with reference to FIG. 1 and FIG. 2. FIG. 2 is a diagram for explaining an electrical connection between the optical modulator 120, the connecting member 130, and the driver 150 according to the present embodiment. FIG. 2 corresponds to a cross-sectional view in the I-I line of FIG. 1.

As illustrated in FIG. 1 and FIG. 2, the cut-out portion 201 is formed near the PCB 110 of the optical modulator 120, and one end of the connecting member 130 is connected to the optical modulator 120 inside of the cut-out portion 201 formed in the optical modulator 120. In other words, a connector 202 is embedded in the upper surface of the cut-out portion 201 of the optical modulator 120. A coaxial terminal of the connector 202 protrudes from the upper surface of the cut-out portion 201 into the interior of the optical modulator 120, and is connected to a wiring pattern formed on the relay board 124 inside of the optical modulator 120 by, for example, wire. For example, a push-on connector can be used as the connector 202. The connecting member 130 is inserted into the connector 202 and is in contact with the coaxial terminal of the connector 202, so that the connecting member 130 and the optical modulator 120 are electrically connected to each other.

The cut-out portion 201 of the optical modulator 120 accommodates the driver 150 so that the driver 150 overlaps the optical fiber 121a when viewed from a direction perpendicular to the PCB 110. As explained above, the input interface of the data signal input to the driver 150 is formed at a position close to the optical fiber 121a. In this way, the driver 150 is accommodated in the cut-out portion 201 of the optical modulator 120, and detouring of the wiring is thereby avoided when the driver 150 overlapping the optical fiber 121a when viewed from the direction perpendicular to the PCB 110 and the input interface are connected by the wiring pattern. As a result, an increase in the mounting area caused by the detouring of the wiring is suppressed, and the device can be downsized.

Moreover, the cut-out portion 201 of the optical modulator 120 accommodates the wiring pattern 140 connected to the driver 150. In other words, the wiring pattern 140 is connected to the driver 150 in the interior of the cut-out portion 201 and is bent so as to approach the lower side of the connector 202 embedded in the upper surface of the cut-out portion 201. Then, a connector 203 is fixed to one end of the wiring pattern 140 on the connector 202 side. For example, a push-on connector can be used as the connector 203. The connecting member 130 is inserted into the connector 203 and is in contact with the coaxial terminal of the connector 203, so that the connecting member 130 and the driver 150 are electrically connected to each other via the wiring pattern 140.

Here, the driver 150 is accommodated in the cut-out portion 201 of the optical modulator 120, so that the relay board 124 inside of the optical modulator 120 is arranged so as to approach the optical fiber 121b by only the size of an accommodating portion of the driver 150 along the longitudinal direction of the modulator chip 122. The RF electrode 122b of the modulator chip 122 to which the RF signal is input from the relay board 124 is formed at a position corresponding to the relay board 124 along the optical waveguide 122a of the modulator chip 122. Therefore, the positions of the relay board 124 and the RF electrodes 122b along the longitudinal direction of the modulator chip 122 are defined according to the size of the accommodating portion of the driver 150. Because of this, when the position of the driver 150 accommodated in the cut-out portion 201 and the positions of the RF electrodes 122b separate, in the modulator chip 122, wasted space is more likely to be produced in an area closer to the driver 150 accommodated in the cut-out portion 201 than the RF electrode 122b.

Therefore, in the present embodiment, it is preferable to apply a structure, in which the wasted space is not produced in the area closer to the driver 150 accommodated in the cut-out portion 201 than the RF electrode 122b, to the modulator chip 122. That is, in the present embodiment, as illustrated in FIG. 1, the DC electrodes 122c are formed in locations closer to the driver 150 accommodated in the cut-out portion 201 than the RF electrodes 122b along the optical waveguide 122a of the modulator chip 122. In this way, in the modulator chip 122, because the area closer to the driver 150 accommodated in the cut-out portion 201 than the RF electrodes 122b is used as an area where the DC electrodes 122c are formed, the wasted space is not produced in the area. As a result, the size in the longitudinal direction of the optical modulator 120 is reduced.

As explained above, according to the present embodiment, the cut-out portion is formed on the board side of the optical modulator connected to the optical fiber, and the driver is accommodated in the cut-out portion so that the driver for generating the electrical signal for optical modulation according to the data signal overlaps the optical fiber when viewed from the direction perpendicular to the board. Therefore, detouring of the wiring is avoided when the driver and the input interface for the data signal arranged close to the optical fiber are connected to each other. As a result, it is possible to reduce the mounting area corresponding to the space where the wiring is provided and to downsize the device.

Figure 3:
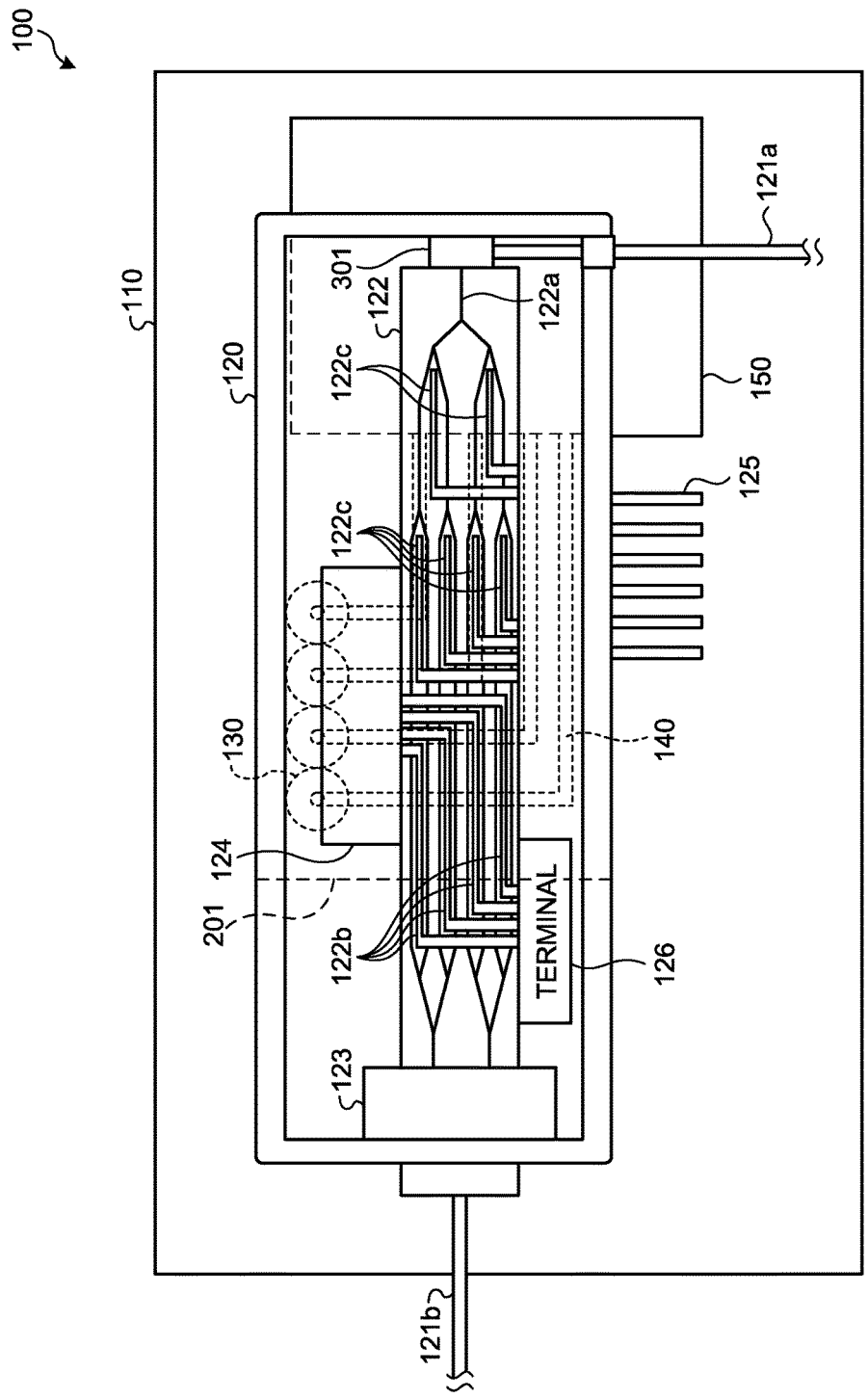
FIG. 3 is a schematic plan view illustrating a configuration of an optical module according to a first modification.

The embodiment represents the case where the optical fibers 121a and 121b are arranged in the longitudinal direction of the optical modulator 120 (modulator chip 122), however, the optical fiber 121a may be disposed in a direction crossing the longitudinal direction of the modulator chip 122. FIG. 3 is a schematic plan view illustrating a configuration of the optical module 100 according to a first modification. As illustrated in FIG. 3, the same reference signs are assigned to the same portions as these of FIG. 1.

As illustrated in FIG. 3, in the optical module 100 according to the first modification, the optical fiber 121a is arranged in the direction crossing the longitudinal direction of the modulator chip 122. In this case, the traveling direction of the light emitted from the optical fiber 121a is different from the extending direction of the optical waveguide 122a of the modulator chip 122. Therefore, in the first modification, the optical fiber 121a and the modulator chip 122 of the optical modulator 120 are optically connected via an optical-path conversion element 301, so that the optical path of the light emitted from the optical fiber 121a is changed to an optical path directed toward the optical waveguide 122a by the optical-path conversion element 301. This makes it possible to reduce the size in the longitudinal direction of the optical modulator 120.

Figure 4:
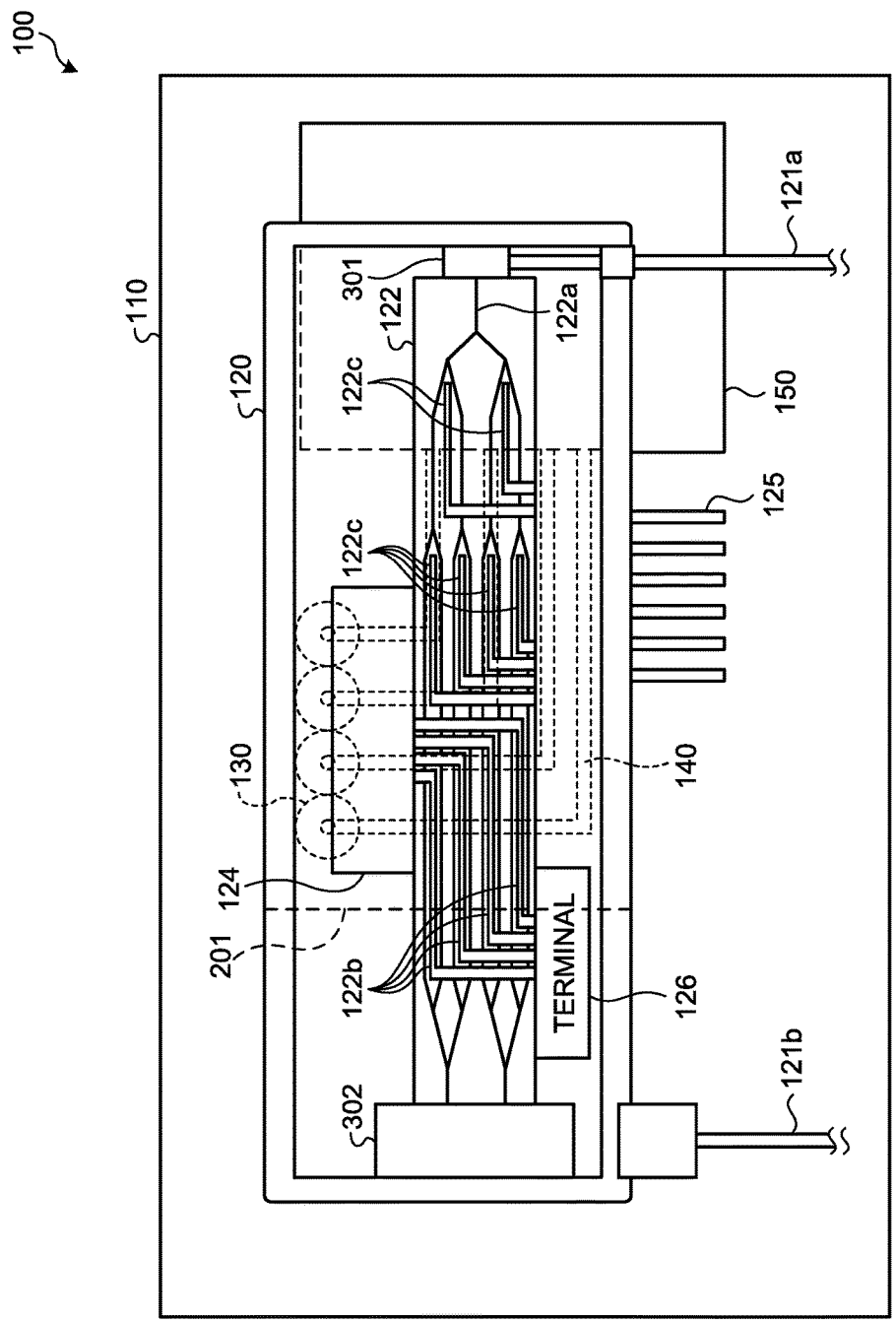
FIG. 4 is a schematic plan view illustrating a configuration of an optical module according to a second modification.

In the first modification illustrated in FIG. 3, because the optical fiber 121b is arranged in the longitudinal direction of the optical modulator 120 (modulator chip 122), the size in the longitudinal direction of the optical modulator 120 is increased by the length of the optical fiber 121b. Therefore, for example, as illustrated in FIG. 4, the optical fiber 121b may be arranged in the direction crossing the longitudinal direction of the modulator chip 122. FIG. 4 is a schematic plan view illustrating a configuration of the optical module 100 according to a second modification. In this case, the traveling direction of the light (optical signal) output from the modulator chip 122 of the optical modulator 120 is different from the arrangement direction of the optical fiber 121b. Therefore, in the second modification, the modulator chip 122 of the optical modulator 120 and the optical fiber 121b are optically connected via an optical-path conversion element 302, so that the optical path of the light output from the modulator chip 122 of the optical modulator 120 is changed to an optical path directed toward the optical fiber 121b by the optical-path conversion element 302. This makes it possible to further reduce the size in the longitudinal direction of the optical modulator 120. The optical-path conversion element 302 also has a function as PBC.

Figure 5:
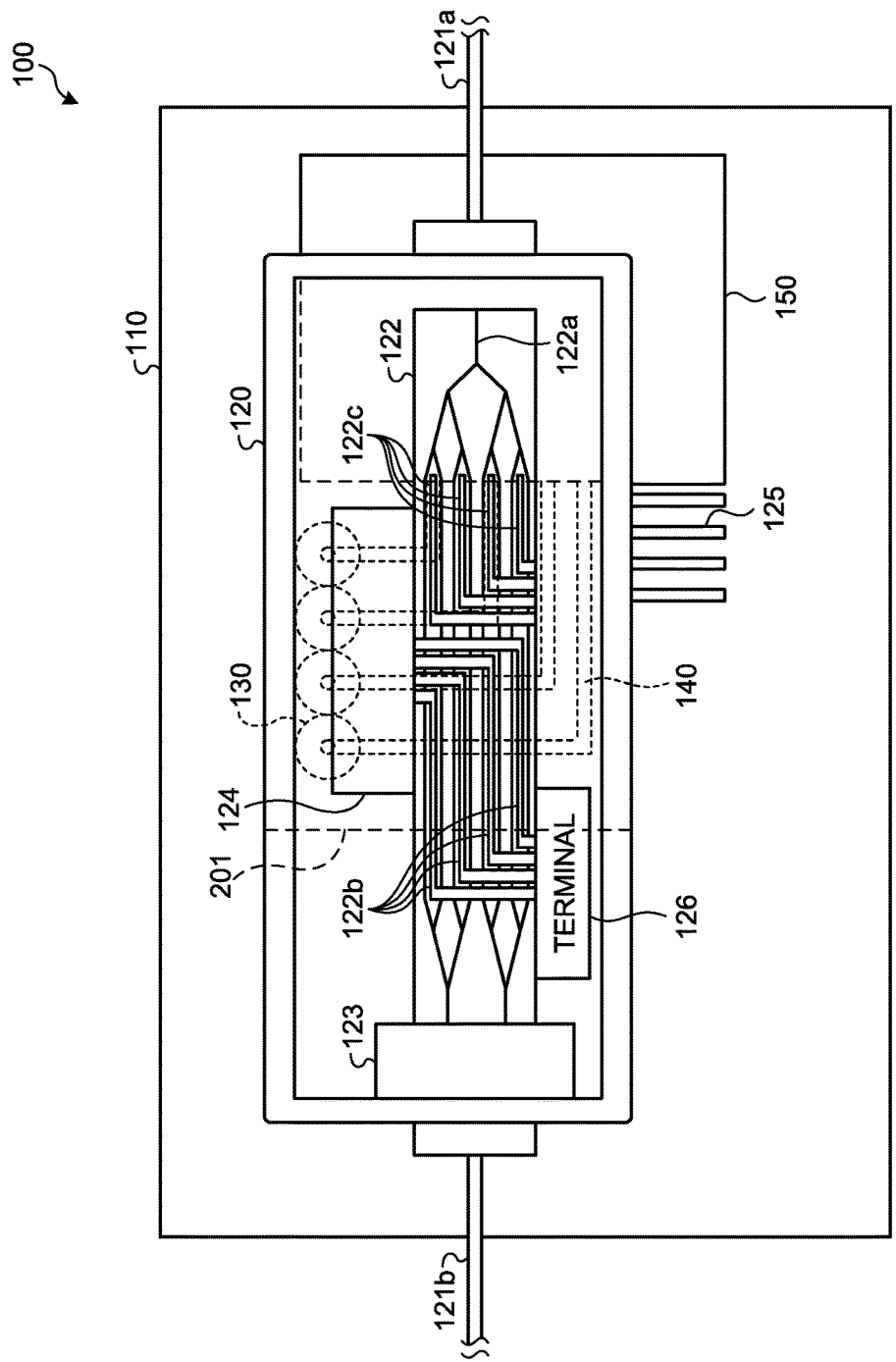
FIG. 5 is a schematic plan view illustrating a configuration of an optical module according to a third modification.

The embodiment represents the case where the six DC electrodes 122c are formed, on the modulator chip 122, corresponding to the two first Mach-Zehnder type optical waveguides and the four second Mach-Zehnder type optical waveguides, however, the number of DC electrodes 122c may be reduced. FIG. 5 is a schematic plan view illustrating a configuration of the optical module 100 according to a third modification. As illustrated in FIG. 5, the same reference signs are assigned to the same portions as these of FIG. 1.

As illustrated in FIG. 5, in the modulator chip 122, four DC electrodes 122c are formed corresponding only to the four second Mach-Zehnder type optical waveguides. In other words, in the configuration illustrated in FIG. 5, two DC electrodes 122c corresponding to the two first Mach-Zehnder type optical waveguides are omitted as compared with the configuration illustrated in FIG. 1. This makes it possible to further reduce the size in the longitudinal direction of the optical modulator 120.

Figure 6:
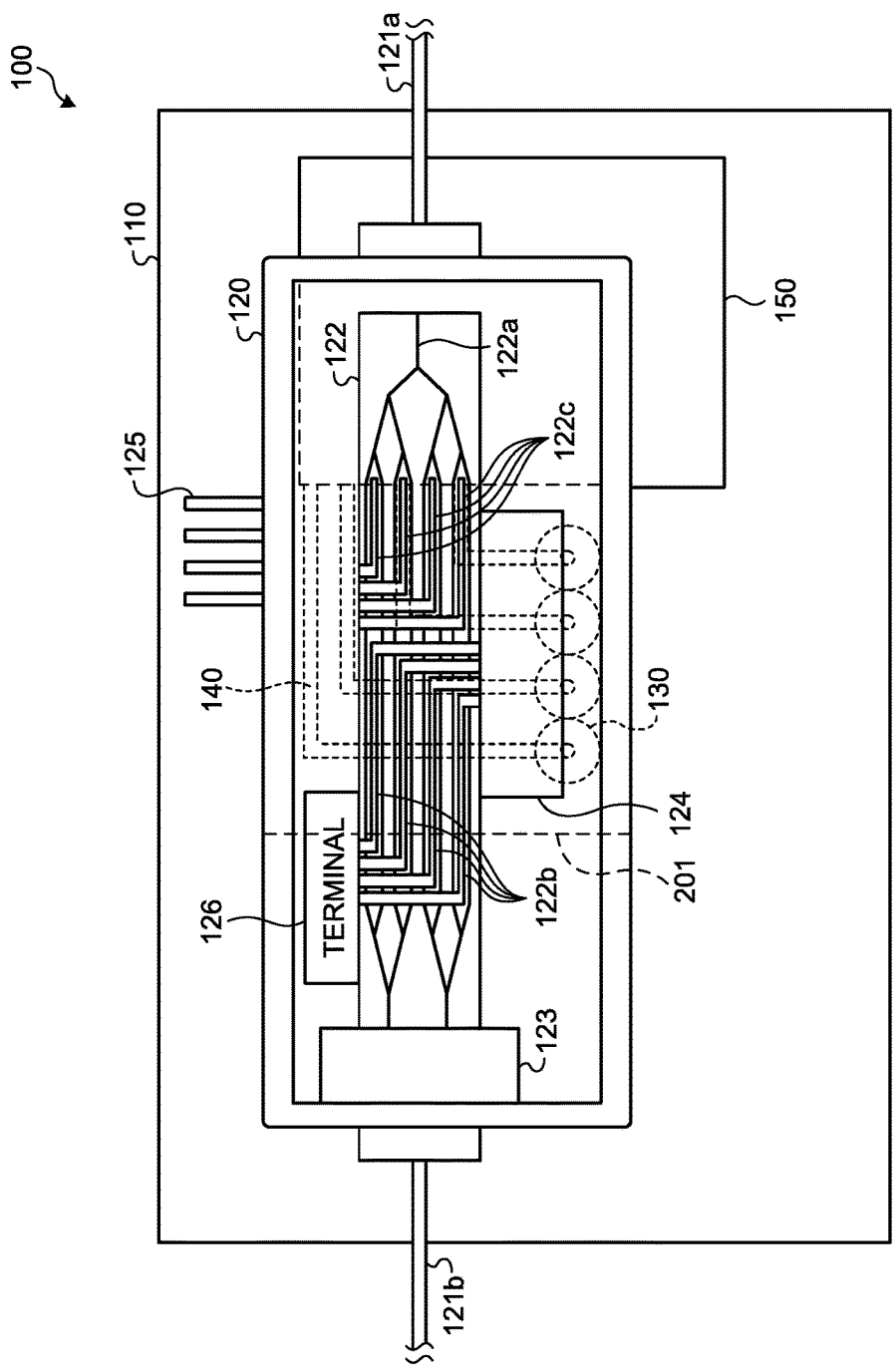
FIG. 6 is a schematic plan view illustrating a configuration of an optical module according to a fourth modification.

The optical module 100 according to the embodiment and the modifications represents the example of arrangement such that the relay board 124 and the connecting member 130 are arranged on a first side face side of the optical modulator 120, and the DC terminals 125 and the termination board 126 are arranged on a second side face side which is the opposite side to the first side face. However, the disclosed technology is not limited thereto. For example, as illustrated in FIG. 6, the DC terminals 125 and the termination board 126 may be arranged on the first side face side of the optical modulator 120, and the relay board 124 and the connecting members 130 may be arranged on the second side face side which is the opposite side to the first side face. FIG. 6 is a schematic plan view illustrating a configuration of the optical module 100 according to a fourth modification. As illustrated in FIG. 6, the same reference signs are assigned to the same portions as these of FIG. 5.

In the fourth modification illustrated in FIG. 6, because the DC terminals 125 protrude near the end face of the PCB 110 from the side face of the optical modulator 120 along a direction parallel to the PCB 110, wasted space is likely to be produced between the side face of the optical modulator 120 and the end face of the PCB 110. Therefore, for example, as illustrated in FIG. 7, DC terminals 325 may be provided in the optical modulator 120 instead of the DC terminals 125. FIG. 7 is a schematic plan view illustrating a configuration of the optical module 100 according to a fifth modification. As illustrated in FIG. 7, the DC terminals 325 penetrate the outer frame of the optical modulator 120 along the direction perpendicular to the PCB 110, and protrudes from the upper surface of the cut-out portion 201 downward. The DC terminals 325 are electrically connected to the wiring pattern extending from the LSI in the cut-out portion 201. This makes it possible to reduce the wasted space between the side face of the optical modulator 120 and the end face of the PCB 110, and, as a result, downsizing of the device can be promoted.

According to one aspect of the optical module disclosed in the present application, it is possible to downsize the device.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical module comprising:
   a driver that is provided on a board and generates an electrical signal according to a data signal; and
   an optical modulator that is connected to an optical fiber and provided on the board and that modulates light emitted from the optical fiber using the electrical signal generated by the driver, wherein
   the optical modulator is connected to the optical fiber disposed in parallel with the board; and
   the optical module has a cut-out portion that is formed by cutting out part of an outer shape of the optical module and that accommodates the driver so that the driver overlaps the optical fiber disposed in parallel with the board when viewed from a direction perpendicular to the board and the driver is connected to an input interface which is, on the board, formed at a position close to the optical fiber and inputs the data signal into the driver, wherein
   the optical modulator includes:
   an optical waveguide that propagates the light emitted from the optical fiber;
   a first electrode that is formed along the optical waveguide and to which an electrical signal generated by the driver is input; and
   a second electrode that is formed along the optical waveguide and to which another electrical signal different from the electrical signal is input, wherein
   the second electrode is formed at a location, along the optical waveguide, closer to the driver accommodated in the cut-out portion than the first electrode.

2. The optical module according to claim 1, wherein the electrical signal is a radio frequency (RF) signal, and the another electrical signal is a direct current (DC) signal.

3. The optical module according to claim 1, further comprising:
   a wiring pattern that is connected to the driver and provided on the board and that transmits an electrical signal generated by the driver to the optical modulator, wherein
   the cut-out portion of the optical modulator accommodates the driver and the wiring pattern.

4. An optical modulator that is connected to an optical fiber disposed in parallel with a board and that is provided on the board and that modulates light emitted from the optical fiber using an electrical signal, comprising:
   a cut-out portion that is formed by cutting out part of an outer shape of the optical module and that accommodates a driver so that the driver for generating the electrical signal according to a data signal overlaps the optical fiber disposed in parallel with the board when viewed from a direction perpendicular to the board and the driver is connected to an input interface which is, on the board, formed at a position close to the optical fiber and inputs the data signal into the driver;
   an optical waveguide that propagates the light emitted from the optical fiber;
   a first electrode that is formed along the optical waveguide and to which an electrical signal generated by the driver is input; and a second electrode that is formed along the optical waveguide and to which another electrical signal different from the electrical signal is input, wherein the second electrode is formed at a location, along the optical waveguide, closer to the driver accommodated in the cut-out portion than the first electrode.

5. The optical modulator according to claim 4, wherein the electrical signal is a radio frequency (RF) signal, and the another electrical signal is a direct current (DC) signal.

\* \* \* \* \*